United States Patent [19]

Ashmead et al.

[11] Patent Number: 4,491,464

[45] Date of Patent: Jan. 1, 1985

[54] POTASSIUM POLYPHOSPHATE PROTEIN HYDROLYSATE FERTILIZER

[76] Inventors: Harvey H. Ashmead, 719 E. Center St., Kaysville, Utah 84037; Hsin-Hung Hsu, 2128 N. 1300 W., Clinton, Utah 84015

[21] Appl. No.: 495,269

[22] Filed: May 17, 1983

[51] Int. Cl.$^3$ .......................... C05G 3/00; C05B 13/06

[52] U.S. Cl. ............................................ 71/11; 71/34; 71/51; 71/61; 71/64.1

[58] Field of Search ................... 71/11, 27, 23, 34, 61, 71/64.10, 113, 16, 24, 51; 435/254, 255, 804

[56] References Cited

U.S. PATENT DOCUMENTS 4,243,685 1/1981 Simon et al. .................... 435/254 X

*Primary Examiner*—Ferris H. Lander

*Attorney, Agent, or Firm*—Thorpe, North & Western

[57] ABSTRACT

The effectiveness of a potassium polyphosphate fertilizer is enhanced resulting in higher intake of phosphorus and potassium into plant tissues and higher crop yields by the foliar application to growing plants of a composition comprising a blend of potassium and ammonium polyphosphates which also contains an effective amount of a protein hydrolysate.

8 Claims, No Drawings

POTASSIUM POLYPHOSPHATE PROTEIN HYDROLYSATE FERTILIZER

STATE OF THE ART AND BACKGROUND OF THE INVENTION

This invention relates to a composition and method for increasing the uptake of potassium and phosphorus into the tissues of living plants and, therefore, increasing crop yield.

More particularly, this invention relates to a composition and method for enhancing the effectiveness of potassium polyphosphates in increasing crop yield through the increased uptake of potassium and phosphorus into the crop plant tissues.

The use of potassium polyphosphates in liquid fertilizers for supplying phosphorus and potassium is well known. For example, Cox, U.S. Pat. No. 3,856,500 teaches potassium and ammonium polyphosphates containing heavy metal micronutrients as liquid fertilizers.

One problem associated with the use of potassium polyphosphates has been the inability of the plant tissue to absorb adequate quantities for proper plant growth. The proposed remedy to this problem has been to increase the dosage in an attempt to force the desired absorption. However, this results in inefficient use of the potassium polyphosphate which can prove to be expensive to the farmer and wasteful of materials.

OBJECTS AND SUMMARY OF THE INVENTION

It is an object of the present invention to provide a composition of ingredients which will enable increased levels of absorption of both phosphorus and potassium from potassium polyphosphates into plant tissues over that obtained when applying polyphosphates alone.

It is also an object of the present invention to provide a composition containing potassium polyphosphate which will not only increase the level of phosphorus and potassium absorption into plant tissue, but will also provide increased crop yields over those obtained from the application of potassium polyphosphate alone.

These and other objects may be accomplished by means of an aqueous composition of potassium polyphosphate, ammonium polyphosphate and a protein hydrolysate wherein the majority of the protein has been hydrolyzed to a polypeptide, dipeptide or single amino acid state. This composition is suitable for foliar application to plant tissues. The hydrolyzed protein may contribute to the nitrogen content of the fertilizer. However, since the nitrogen content may vary widely, the nitrogen contained in the hydrolyzed protein may or may not be significant. Other nitrogen supplements such as urea, ammonium sulfate, ammonium nitrate and other nitrogen-based ferilizers can also be used to replace some or all of the ammonium polyphosphates.

DETAILED DESCRIPTION

It is customary in the fertilizer industry to refer to nitrogen, phosphorus and potassium by their chemical symbols, N, P and K, and to collectively refer to combinations containing them as NPK fertilizers. The percentage of each are reported in terms of percent N, percent $P_2O_5$ (phosphorus pentoxide) and percent $K_2O$ (potassium oxide) even though these elements are not present specifically in that form.

Potassium polyphosphates may be prepared by reacting superphosphoric acid with a basic potassium compound such as potassium hydroxide, carbonate and bicarbonate. The distinction between meta-, pyro- and other polyphosphates from orthophosphates is well known and documented such as by U.S. Pat. No. 3,856,500 and standard chemical texts. Therefore, it would serve no useful purpose to attempt to discuss the chemical and physical properties of potassium or ammonium polyphosphates.

However, because polyphosphates are relatively unstable and tend to convert back to orthophosphates in the presence of water, they should be used as soon as possible after being diluted for use as a foliar spray.

There is some reference to the use of hydrolyzed proteins as fertilizers, such as taught in U.S. Pat. Nos. 3,000,789, 4,006,004 and 4,006,005.

It is also known to use chelates of trace minerals such as iron, copper, zinc, calcium, manganese and magnesium chelated with protein hydrolysates to increase the uptake of these chelated trace minerals into plant tissues. Typical use of these chelates may be found in U.S. Pat. Nos. 3,873,296; 4,169,716; 4,169,717; 4,216,143 and 4,216,144.

However, it has not been heretofor known to utilize protein hydrolysates in admixture with potassium polyphosphate to increase crop yield through the increased uptake of phosphorus and potassium.

The hydrolyzed protein is used in admixture with the potassium polyphosphate and is not believed to enter into any kind of chemical reaction with the polyphosphate. It is believed that the hydrolyzed protein serves as a promotor for enhancing the uptake of phosphorus and potassium into plant tissues. Interestingly, the use of hydrolyzed protein appears to have little, if any, effect on increasing the uptake of nitrogen. However, the plant may assimilate the nitrogen from the protein hydrolysate more easily than from nitrogen gas, ammonia (including the ammonium ion) and other nitrogen sources, and thus, have a nitrogen sparing effect.

The increase in phosphorus and potassium uptake, when potassium polyphosphate is administered to plant tissues in admixture with hydrolyzed protein, is truly an unexpected result since the hydrolyzed protein is not a source of phosphorus and potassium.

Preferably, the polyphosphate utilized is an admixture of potassium and ammonium polyphosphates to which is added the hydrolyzed protein.

Any suitable protein source may be used to form the hydrolysate. Isolated soy or other grain, vegetable or plant-derived proteins may be hydrolyzed as may casein, albumin, gelatin or any other product capable of producing polypeptides, peptides and naturally occurring amino acids. Such natural amino acids include alanine, arginine, aspartic acid, cystine, diiodotyrosine, glutamic acid, glycine, histidine, hydroxyproline, isoleucine, leucine, lysine, methionine, phenylalanine, proline, serine, threonine, thyroxine, tryptophan, tyrosine, valine, aspartamine and glutamine. Preferably, the protein hydrolysate will be derived from plant tissues with hydrolyzed soy isolate being particularly preferred.

A peptide or polypeptide may be made from a combination of two or more like or different amino acids and may have a configuration ranging from two glycine molecules up to polypeptide chains having molecular weights in the thousands provided they are sufficiently water soluble to be applied to plant tissues as a foliar spray.

The protein may be hydrolyzed by any conventional method by using acids, bases, enzymes, or combinations thereof.

The formulations are preferably prepared as a liquid concentrate which may subsequently be diluted to provide the proper dosage. Concentrates may be prepared containing about 2% to 5% nitrogen, 15% to 19% phosphorus (as $P_2O_5$), 15% to 19% potassium (as $K_2O$) and 0.5% to 3% hydrolyzed protein. Preferably, the concentrates will contain about 3% to 4% nitrogen, 16% to 18% phosphorus (as $P_2O_5$), 16% to 18% potassium (as $K_2O$) and 1% to 2% hydrolyzed protein. The phosphorus and potassium concentrations will be provided in the form of a mixture of potassium and ammonium polyphosphates. The upper limit of protein hydrolysate concentration is a practical one determined primarily by solubility and economics. Preferably, the ratio of polyphosphate blend to protein hydrolysate will be between about 200:1 to 20:1.

Compositions of the present invention are prepared by admixing the various components with sufficient water to form the concentrate. Surfactants, wetting agents or other additives may also be combined if desired. The concentrate is then diluted with the desired amount of water in a mixing tank or sprayer and thoroughly mixed just prior to application as a foliar spray. Dilution ratios may vary from as low as 5 volumes of water per volume of concentrate to as high as 200 volumes of water per volume of concentrate, i.e., ratios of from 5:1 to 200:1. Generally speaking, dilution ratios from 10:1 to 100:1 will be preferable.

Since the NPK dosage requirements may vary according to plant species, geographical location, climate, season of year, etc., it is not possible to specify exact dosages. However, the amount to be applied to any given crop will be referred to herein as an "effective amount." Effective amounts may be determined by calculation or empirically by those having ordinary skill in the art. For this reason, the invention does not lie as much in specific concentrations as in the discovery that a combination of potassium polyphosphate and protein hydrolysate serves to increase phosphorus and potassium contents in plant tissues when the combination is applied to plants as a foliar spray. A resultant effect of the increase in phosphorus and potassium content is an increase in crop yield.

Preferably, a composition is applied as a foliar spray one or more times at intervals between germination of the plant and maturity of the fruit or crop to be obtained from the plant.

The invention can best be illustrated by the following examples which show the unexpected increase in phosphorus and potassium into plant tissues. Increase in crop yield is also shown. However, the examples are for purposes of illustration only and are not to be interpreted as defining the scope of the invention.

EXAMPLE I

This example illustrates increased plant growth and uptake of phosphorus and potassium in corn plants. A water control and NPK solutions having identical N, $P_2O_5$ and $K_2O$ concentrations were prepared as follows:

Solution A—Control—water only.

Solution B—A liquid concentrate of urea, $KH_2PO_4$ and $K_2HPO_4$ (mono and dipotassium orthophosphates) containing 4% w N, 17% w $P_2O_5$ and 17% w $K_2O$ was diluted 80:1 with water to a concentration of 0.05% N, 0.21% $P_2O_5$ and 0.21% $K_2O$.

Solution C—A mixture containing potassium polyphosphate, ammonium polyphosphate and 1% hydrolyzed protein containing 4% w N, 17% w $P_2O_5$ and 17% w $K_2O$ was diluted 80:1 with water to a concentration of 0.05% N, 0.21% $P_2O_5$ and 0.21% $K_2O$.

Nine pots were planted with corn (Pioneer). Upon germination, the corn was thinned to five (5) plants to each pot. Two weeks post emergence, the corn plants in three pots were sprayed with 35 mls each of water (Solution A); the corn in three other pots were sprayed with 35 mls each of potassium orthophosphate (Solution B); and the corn in the remaining three pots was sprayed with 35 mls each of potassium polyphosphate with hydrolyzed protein (Solution C).

All pots were retained in a greenhouse under identical conditions of heat, light and moisture. On the 45th day after germination, each corn plant was cut off at ground level and dried in an oven at 78° C. for 24 hours and then weighed. The results are reported in Table I as follows:

TABLE I

| | Dry Weight (g/pot) | | | Average Weight | |
|---|---|---|---|---|---|
| Treatment | 1 | 2 | 3 | g/pot | g/plant |
| Solution A | 28.4 | 26.7 | 22.7 | 25.9 | 5.2 |
| Solution B | 19.8 | 23.7 | 22.5 | 22.0 | 4.4 |
| Solution C | 29.5 | 28.8 | 27.2 | 28.5 | 5.7 |

The corn plants from each pot were then ground into a homogeneous composite and analyzed by atomic absorption spectrophotometry for phosphorus concentration. The results are found in Table II.

TABLE II

| | % w Phosphorus | | | |
|---|---|---|---|---|
| Treatment | 1 | 2 | 3 | Average |
| Solution A | 0.447 | 0.478 | 0.474 | 0.466 |
| Solution B | 0.508 | 0.494 | 0.742 | 0.581 |
| Solution C | 0.628 | 0.800 | 0.860 | 0.763 |

It is evident from the above that the corn plants treated with potassium polyphosphate plus protein hydrolysate absorbed more phosphorus than corn plants treated with the same concentration of potassium orthophosphates.

EXAMPLE II

The procedure of Example I was repeated with the exception that Solution B (potassium orthophosphates plus urea) was replaced by Solution D which consisted of a potassium and ammonium polyphosphate mixture containing 3% w N, 18% w $P_2O_5$ and 18% w $K_2$. Urea was added to this mixture which was then diluted to provide a solution containing 0.05% N, 0.21% $P_2O_5$ and 0.21% $K_2O$. In other words, the difference between Solution C and Solution D was that Solution C contained hydrolyzed protein. The dry weight of the corn plants are found in Table III.

TABLE III

| | Dry Weight (g/pot) | | | Average Weight | |
|---|---|---|---|---|---|
| Treatment | 1 | 2 | 3 | g/pot | g/plant |
| Solution A | 36.2 | 31.8 | 37.4 | 35.1 | 7.0 |
| Solution D | 38.3 | 32.0 | 40.6 | 37.0 | 7.4 |
| Solution C | 41.6 | 34.8 | 42.1 | 39.5 | 7.9 |

The dried corn plants were ground into a homogenous composite and then analyzed by atomic absorption spectrophometry for concentration of nitrogen, phosphorus and potassium. The results are reported in Table IV.

TABLE IV

| | N (%) | | | | P (%) | | | | K (%) | | | |
|---|---|---|---|---|---|---|---|---|---|---|---|---|
| Treatment | 1 | 2 | 3 | Ave | 1 | 2 | 3 | Ave | 1 | 2 | 3 | Ave |
| Solution A | 3.90 | 3.61 | 3.43 | 3.65 | .20 | .18 | .21 | .20 | 3.20 | 3.01 | 3.30 | 3.17 |
| Solution D | 3.91 | 3.56 | 3.62 | 3.70 | .25 | .21 | .28 | .25 | 3.25 | 3.62 | 3.83 | 3.57 |
| Solution C | 4.02 | 3.43 | 3.63 | 3.69 | .32 | .31 | .27 | .30 | 3.40 | 3.43 | 3.98 | 3.60 |

Several interesting conclusions can be drawn from the above results. As regards nitrogen, it appears that the nitrogen content of the plant tissues is not affected significantly by the use of potassium polyphosphates with or without protein hydrolysates. On the other hand, both phosphorus and potassium contents were higher in plants treated with potassium polyphosphate as compared to controls treated with water. Even higher phosphorus and potassium contents were obtained when the hydrolyzed protein was added to the potassium polyphosphate. The higher phosphorus and potassium content resulted in higher plant weights with the highest weights being attained when the protein hydrolysate was added to the polyphosphate blend.

While corn plant weights may not necessarily translate directly to higher corn yields, the following example shows the results of an actual field trial on a potato crop.

EXAMPLE III

A field was planted with potatoes (Russet). An experimental section was divided into four quarters with each quarter containing four plots measuring 30×40 feet. Each plot was divided from an adjacent plot by a five foot buffer strip.

A liquid blend of potassium and ammonium polyphosphates containing 2% hydrolyzed protein was prepared which analyzed 4% N, 18% $P_2O_5$ and 18% $K_2O$. Foliar sprays were prepared by diluting this liquid blend by ratios of 50, 25 and 12.5 with water just prior to application and compared against a water spray control. For purposes of clarity, the sprays are identified as Solutions E–H as follows:

Solution E—Water spray control.

Solution F—0.08% N, 0.36% $P_2O_5$, 0.36% $K_2O$, and 0.04% hydrolyzed protein (50 dilution).

Solution G—0.16% N, 0.72% $P_2O_5$, 0.72% $K_2O$ and 0.08% hydrolyzed protein (25 dilution).

Solution H—0.32% N, 1.44% $P_2O_5$, 1.44% $K_2O$ and 0.16% hydrolyzed protein (12.5 dilution).

Each solution was applied to the foliage of the potato plants in replicates of four plots, one from each quarter, as a foliar spray at the rate of thirty gallons on the seventy-first day after planting with a second application being made two weeks later on the eighty-fifth day. The potatoes were harvested on the one hundred and sixty-sixth day after planting. The yields from each plot were reported in terms of sacks per acre and are given in Table V as follows:

TABLE V (yield in sacks per acre)

| | Quarter | | | | |
|---|---|---|---|---|---|
| Treatment | 1 | 2 | 3 | 4 | Average |
| Solution E | 354.3 | 345.3 | 389.2 | 379.2 | 367.0 |
| Solution F | 344.6 | 368.0 | 389.9 | 400.4 | 375.7 |
| Solution G | 344.6 | 363.4 | 414.7 | 404.6 | 381.8 |
| Solution H | 367.9 | 387.3 | 411.5 | 418.5 | 396.3 |

The yields from quarter number one are somewhat inconsistent with the yields from the remaining three quarters. There is some question as to the validity of the data for this quarter. However, in order to be complete, all data from the experiment are included. In general, the data from quarters two, three and four show yield increases in the range of five to ten percent over the control. Even including the data from quarter one, yield increases of 2.4%, 4.0% and 8.0% are reported for solutions F, G and H, respectively.

Separate data for each section are not available. However, Table VI, which follows, presents the composite nitrogen, phosphorus and potassium concentrations for plant tissues treated with each reported solution.

TABLE VI

| Treatment | Ave. N % | Ave. P % | Ave. K % |
|---|---|---|---|
| Solution E | 4.82 | 0.24 | 4.11 |
| Solution F | 4.80 | 0.28 | 4.20 |
| Solution G | 4.90 | 0.37 | 4.77 |
| Solution H | 4.96 | 0.50 | 4.50 |

The above analysis is consistent with the analysis from Example II in that changes in nitrogen concentration are not significant while phosphorus and potassium concentrations appear to be dosage related.

The above description sets forth the invention showing the best mode presently available. More data are being collected and the invention is to be limited in scope only by the following claims.

The following is claimed:

1. A liquid fertilizer composition suitable for dilution and application as a foliar spray comprising a blend of potassium and ammonium polyphosphates containing from about 0.5% to 3.0% by weight of a protein hydrolysate wherein the ratio of the polyphosphate blend to protein hydrolysate is between 200:1 to 20:1.

2. A liquid fertilizer compositon according to claim 1 wherein the protein hydrolysate is a mixture of polypeptides, dipeptides and naturally occurring amino acids resulting from the hydrolysis of intact proteins.

3. A liquid fertilizer composition according to claim 2 wherein the intact protein is a plant protein.

4. A liquid fertilizer composition according to claim 2 containing from about 2% to 5% nitrogen, 15% to 19% $P_2O_5$ and 15% to 19% $K_2O$.

5. A method according to claim 4 wherein the liquid concentrate, prior to dilution, contains from about 2% to 5% nitrogen, 15% to 19% $P_2O_5$ and 15% to 19% $K_2O$.

6. A method of increasing the phosphorus and potassium content of plant tissues which comprises applying to living immature plant tissues, as a foliar spray, an aqueous composition prepared by diluting a liquid concentrate comprising a blend of potassium and ammonium polyphosphates containing from about 0.5% to 3.0% by weight of a protein hydrolysate wherein the ratio of polyphosphate blend to protein hydrolysate is between about 200:1 to 20:1 with water at a dilution ratio of 5 to 200.

7. A method according to claim 6 wherein the protein hydrolysate is a mixture of polypeptides, dipeptides and naturally occurring amino acids resulting from the hydrolysis of intact protein.

8. A method according to claim 7 wherein the intact protein is a plant protein.

* * * * *